May 25, 1965

M. E. WRIGHT 3,185,221

TRIPPABLE FURROW OPENER

Filed Jan. 23, 1964

INVENTOR.
MALCOLM E. WRIGHT.
BY: EMERSON B. DONNELL, ATT'Y.
ROBERT D. GODARD, AG'T.

United States Patent Office 3,185,221
Patented May 25, 1965

3,185,221
TRIPPABLE FURROW OPENER
Malcolm E. Wright, Baton Rouge, La., assignor to J. I. Case Company, Racine, Wis., a corporation of Wisconsin
Filed Jan. 23, 1964, Ser. No. 339,666
7 Claims. (Cl. 172—270)

The present invention relates to agricultural implements, and particularly to furrow openers, and specifically to furrow openers designed for depositing seed; the invention being particularly applicable to such openers operating for example with lister bottoms and designed to open the subsoil for planting of seeds at the bottom of the furrow opened by the lister, and an object of the invention is to generally improve the construction and operation of devices of this particular class.

In a device for this purpose, the depth of the furrow for receiving the seed is likely to be quite critical and therefore an accurate adjustment of the height of the opener is very desirable. Furthermore, an opener running in this position is particularly vulnerable to obstructions which may be passed over by the lister bottom, and so it is desirable to have the opener capable of release without damage if a rock or other obstruction is encountered. Conventional release and adjustment devices, however, tend to be costly, and more so than is justified in a device of this type. Accordingly, it is a principal object of the invention to provide a subsoiler seed boot or opener with effective means for depth adjustment and an effective overload release, all of which can be furnished without excessive cost.

The low cost of the device is due partly to the use of parts of the device for one purpose, which parts are already present in the device for another.

The manner of construction of the device will be fully set forth in the following specification and illustrated in the accompanying drawings, in which.

Figure 3:
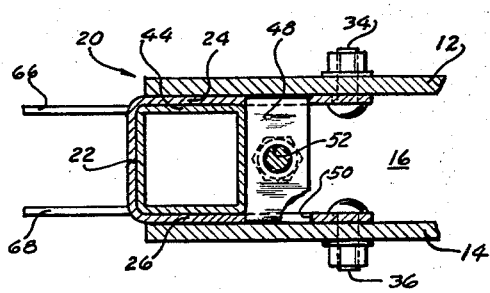
FIG. 3 is a horizontal sectional view on the line 3—3 of FIG. 1.
Figure 4:
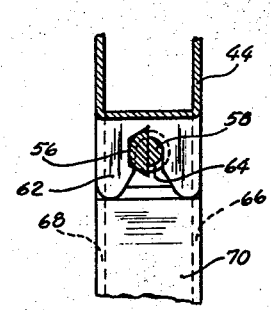
FIG. 4 is a horizontal sectional view on the line 4—4 of FIG. 2.
Figure 1:
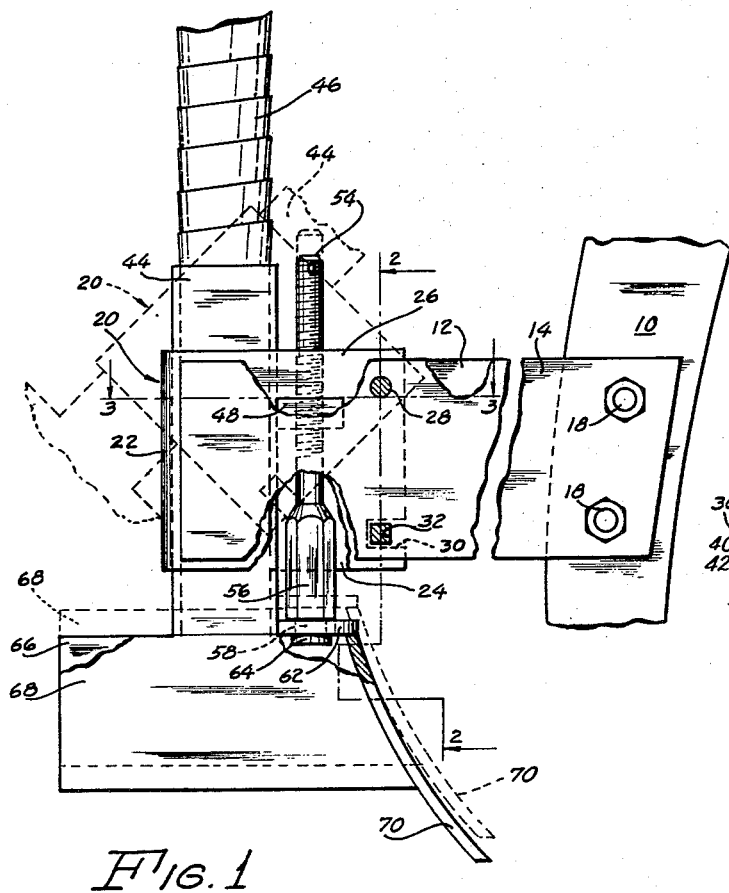
FIG. 1 is a fragmentary side elevation of a device embodying the invention as it would be applied to a lister standard.

Similar reference characters have been applied to the same parts wherever they occur throughout the specification and drawings. As seen in FIG. 1, the device is supported on a standard 10 which would ordinarily also carry a lister bottom, not shown, but which might be any rigid element carried on a tractive vehicle. It comprises spaced side plates 12 and 14 arranged in substantially parallel vertical planes so as to provide a substantially vertical space 16 therebetween (see also FIG. 3). Plates 12 and 14 are secured to standard 10 in any desired or suitable manner, as by bolts 18.

Figure 2:
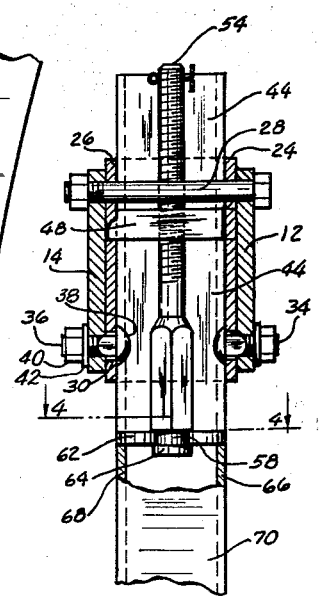
FIG. 2 is a vertical sectional view, substantially on the line 2—2 of FIG. 1.

Between plates 12 and 14 so as to occupy a part of the space 16, is arranged a yoke member or support means 20 which has an upwardly directed rear side or side web portion 22 between two substantially identical flanges or side portions 24 and 26, which are connected with each other by web portion 22, and which normally lie in face-to-face contact with plates 12 and 14 respectively within space 16. Plates 12 and 14 and side portions 24 and 26 provide suitable aligned openings to receive a bolt 28, by which yoke 20 is pivotally supported in space 16. Furthermore, side portions 24 and 26 are provided with notches as 30, aligned with openings as 32 in side plates 12 and 14, and which receive clamping bolts 34 and 36. Bolts 34 and 36 are preferably identical so that only one need be described. As seen in FIG. 2, bolt 36 has a head 38 which engages the inner surface of side 26. A nut 40 on bolt 36 engages a washer 42 and clamps side portion 26 into strong frictional contact with plate 14. Bolt 34 operates in an identical manner to clamp side portion 24 against side plate 12. Yoke 20 is therefore held in position in a rugged manner, but in the event of a severe overload, side portions 24 and 26 may slip out of engagement with bolts 34 and 36 and the yoke may pivot about bolt 28 into the dotted position indicated in FIG. 1. This will serve to shield the parts from all forces greater than that necessary to slip side portions 24 and 26 out of engagement with bolts 34 and 36.

Yoke portion 20 serves to support and guide a shank 44 which is hollow and receives seeds through the usual flexible tube 46. Shank 44 preferably engages the rear or web portion 22 and is also guided between side portions 24 and 26 for free up-and-down movement. Also a trunnion block 48 is supported from side portions 24 and 26 in a position to act as a further guide for shank 44, and to maintain it in running or slidable relation with the rear or web portion 22. While trunnion block 48 might be fastened in various ways within the contemplation of the invention, preferably side portions 24 and 26 are provided with apertures 50 which are complementary to the ends of trunnion block 48 and into which the ends thereof are received. Since there are no openings in side plates 12 and 14 corresponding to opening 50, trunnion block 48 is positively retained in position between side portions 24 and 26, since its ends are substantially in contact with the inner faces of plates 12 and 14. It is therefore positively retained in position in a simple and very rugged manner.

Trunnion block 48 is provided with a threaded opening 52 in which is engaged an adjusting bolt having a threaded portion 54. Trunnion block 48 is preferably of rectangular or similar cross section, and when engaged in openings 50 is fixed against rocking movement in relation to side portions 24 and 26. Adjusting bolt 54 is therefore maintained in fixed orientation to shank 44, and in the present instance is substantially parallel thereto.

Bolt 54 has a head portion 56 preferably angular in cross section so as to furnish a means for rotating bolt 54. A suitable wrench can be applied to the angular head, as will be apparent, for turning bolt 54. Head 56 is provided with a narrow neck-like portion 58 which is engaged in a notch 60 of a detent plate 62, a supplementary head or shoulder 64 being disposed beneath detent plate 62 to form a swivel type connection so that lengthwise movement of bolt 54 will cause corresponding movement of detent plate 62. Shank 44 has dirt plates 66 and 68 which are spaced apart to run in the furrow produced by a blade or opener 70 which may be of any suitable type and attached in any suitable manner to the front edges of plates 66 and 68.

It will now be apparent that turning of head portion 56 with any suitable tool or wrench will cause upward or downward movement of bolt 54 and detent plate 62 and corresponding upward or downward movement of shank 44, and dirt plates 66 and 68. In this manner, the exact depth of opener 70 can be readily controlled without the use of any complicated or costly mechanism.

It will be observed that notch 60 in plate 62 is always open. However, neck portion 58 cannot escape from notch 60 for the reason that bolt 54 is maintained in a substantially vertical position by reason of engagement in the threaded opening 52 of trunnion block 48. Since block 48 cannot rock in its angular openings in side portions 24 and 26, bolt 54 cannot become displaced to any detrimental extent from the position shown in FIG. 1, with the exception of axial displacement as a result of turning head 56. A very simple mechanism has therefore been devised which provides a subsoiler with a very fine depth adjustment.

Shank 44 is ruggedly held in position by backward engagement with the rear or web portion 22, and by forward engagement with trunnion block 48. Shank 44 therefore cannot rock to any appreciable extent, and a very durable vertical adjustment mechanism is therefore provided, due to the use of member 48 both as a trunnion block for adjusting bolt 54, and as a guide for the sliding movement of shank 44.

In case opener 70 hits an obstruction, the force is transmitted to yoke 20 through rear portion 22 of the yoke and trunnion block 48 and, if the force is excessive, it will overcome the frictional engagement of sides 24 and 26 with plates 12 and 14, caused by bolts 34 and 36, and the whole assemblage will swing backwardly about bolt 28 as indicated by the dotted lines in FIG. 1.

Furthermore, the depth of the furrow may be very finely adjusted by turning bolt 54 by means of an ordinary wrench on head 56. Such adjustment is also indicated in dotted lines in FIG. 1.

The operation of this device is thought to be clear from the foregoing description, and what is claimed as new and desired to be secured by Letters Patent of the United States is:

1. In a seed furrow opener construction the combination of a pair of
spaced plates, yoke means between the plates having side portions and a rear portion connecting said side portions, said side portions being in face-to-face contact with said spaced plates, an
opener shank fixed in relation to said yoke means, and
means clamping said side portions in frictional contact with said spaced plates to maintain said yoke means and said shank in position in opposition to normal soil reactions, but to provide for slipping of said yoke means for movement to relieve said shank, said yoke means and said plates from destructive stress if the opener hits an obstruction.

2. In a seed furrow opener construction the combination of a pair of
spaced plates supported in position to provide a substantially vertical space therebetween, a three-sided
yoke having a first side bridging the space between said spaced plates, and a pair of sides connected with the first side and each in face-to-face contact with one of said spaced plates, a
trunnion block extending from one to the other of the second-mentioned sides of said yoke, spaced from said first side, said second-mentioned sides having
opposed apertures in which the ends of said trunnion block are engaged to be retained therein by contact with the opposed surfaces of said spaced plates, an opener shank slidable up-and-down in guided relation between said trunnion block and said first side of said yoke, and between said second-mentioned sides, a
keeper fixed in relation to said shank, spaced from said trunnion block, and adjusting
bolt threaded in said trunnion block and having a portion connected in swiveling relation to said keeper, and
means for rotating said adjusting bolt for adjusting said shank to control the depth of operation of an opener fixed to said shank.

3. In a seed boot the combination of a pair of horizontally spaced plates supported in position to provide a substantially vertical space therebetween, a three-sided yoke having a side bridging the space between said spaced plates, and a pair of sides connected with the first side and each in face-to-face contact with one of said spaced plates, a
trunnion block extending from one to the other of the second-mentioned sides of said yoke spaced from said first side, the last-mentioned sides having
opposed apertures in which said trunnion block is engaged, an opener shank slidable up-and-down in the space between said trunnion block and the first-mentioned side of said yoke, and between said second-mentioned sides, a
keeper fixed in relation to said opener shank spaced from said trunnion block, an adjusting
bolt threaded in said trunnion block and having a portion engaged with said keeper in swiveling relation therewith, and
means for rotating said adjusting bolt for adjusting said shank to control the depth of operation of an opener fixed to said shank.

4. In combination with a seed boot for use in a planter of the type including a beam structure, a substantially horizontal frame comprising a pair of horizontally
spaced plates fixed to the beam structure in position to provide a substantially vertical space therebetween extending in the direction of progress of the implement, a
yoke having a first side bridging the space between said spaced plates, and a pair of sides connected with the first side and each in face-to-face contact with one of said spaced plates,
means securing said yoke in position between said spaced plates, a
trunnion block extending from one to the other of the second-mentioned sides of said yoke spaced from said first side, the last-mentioned sides having
opposed apertures in which said trunnion block is engaged, a hollow opener shank slidable up-and-down in the space between said trunnion block and said first side of said yoke, and between said second-mentioned sides, an apertured
keeper plate fixed in relation to said hollow shank spaced from said trunnion block, an adjusting
bolt threaded in said trunnion block and having a grooved head portion engaged in the aperture in said keeper plate, and
means for rotating said adjusting bolt, for adjusting said shank to control the depth of operation of an opener fixed to said shank.

5. In combination with a subsoiler seed boot for use in a planter of the type including a beam structure, a substantially horizontal frame comprising a pair of horizontally
spaced plates fixed to the beam structure in position to provide a substantially vertical space therebetween extending in the direction of progress of the implement, a
yoke having a first side bridging the space between said spaced plates, and a pair of sides connected with the first side and each in face-to-face contact with one of said spaced plates,
means pivotally securing said yoke in position between said spaced plates, a
trunnion block extending from one to the other of the second-mentioned sides of said yoke spaced from said first side, the last-mentioned sides having
opposed apertures in which said trunnion block is engaged, a hollow opener shank slidable up-and-down in the space between said trunnion block and said first side of said yoke, and between said second-mentioned sides,
means for sliding said hollow opener shank, and
means clamping said second-mentioned sides of said yoke in frictional contact with said spaced plates whereby to maintain said yoke and said shank in position in opposition to normal soil reactions, but to provide for slipping of said yoke for pivotal movement about said pivotal securing means to relieve said shank, said yoke and said plates from destructive stress if the opener hits an obstruction.

6. In combination with a seed boot for use in a planter of the type including a beam structure, a substantially horizontal frame comprising a pair of horizontally spaced plates fixed to the beam structure in position to provide a substantally vertical space therebetween extending in the direction of progress of the implement, a yoke having a first side bridging the space between said spaced plates, and a pair of sides connected with the first side and each in face-to-face contact with one of said spaced plates, means pivotally securing said yoke in position between said spaced plates, a trunnion block extending from one to the other of the second-mentioned sides of said yoke spaced from said first side, the last-mentioned sides having opposed apertures in which said trunnion block is engaged, a hollow opener shank slidable up-and-down in the space between said trunnion block and said first side of said yoke, and between said second-mentioned sides, an apertured keeper plate fixed in relation to said hollow shank spaced from said trunnion block, an adjusting bolt threaded in said trunnion block and having a grooved head portion engaged in the aperture in said keeper plate, means for rotatng said adjusting bolt, for adjusting said shank to control the depth of operation of an opener fixed to said shank, and means clamping said second-mentioned sides of said yoke in frictional contact with said spaced plates whereby to maintain said yoke and said shank in position in opposition to normal soil reactions, but to provide for slipping of said yoke for pivotal movement about said pivotal securing means to relieve said shank, said yoke and said plates from destructive stress if the opener hits an obstruction.

7. In combination with a subsoiler seed boot for use in a planter of the type including a beam structure, a substantially horizontal frame comprising a pair of horizontally spaced plates fixed to the beam structure in position to provide a substantially vertical space therebetween extending in the direction of progress of the implement, a yoke having a first side bridging the space between said spaced plates, and a pair of sides connected with the first side and each in face-to-face contact with one of said spaced plates, means pivotally securing said yoke in position between said spaced plates, a trunnion block extending from one to the other of the second-mentioned sides of said yoke spaced from said first side, the last-mentioned sides having opposed apertures in which said trunnion block is engaged, a hollow opener shank slidable up-and-down in the space between said trunnion block and the first-mentioned side of said yoke, and between said second-mentioned sides, an apertured keeper plate fixed in relation to said hollow shank spaced downwardly from said trunnion block, an adjusting bolt threaded in said trunnion block and having a grooved head portion engaged in the aperture in said keeper plate, means for rotating said adjusting bolt, for adjusting said shank to control the depth of operation of an opener fixed to said shank, and means clamping said second-mentioned sides of said yoke in frictional contact with said spaced plates whereby to maintain said yoke and said shank in position in opposition to normal soil reactions, but to provide for slipping of said yoke for pivotal movement about said pivotal securing means to relieve said shank, said yoke and said plates from destructive stress if the opener hits an obstruction.

References Cited by the Examiner
UNITED STATES PATENTS
2,351,173   6/44   White _____ 111—85

T. GRAHAM CRAVER, *Primary Examiner.*